United States Patent Office 3,474,037
Patented Oct. 21, 1969

3,474,037
STABILIZATION OF ORGANIC BLEACHING
COMPOSITIONS
Henry A. Goldsmith, Torrance, Calif., assignor to United
States Borax & Chemical Corporation, Los Angeles,
Calif., a corporation of Nevada
No Drawing. Filed Nov. 14, 1966, Ser. No. 593,684
Int. Cl. C11d 7/54; D06l 3/06; B01j 1/16
U.S. Cl. 252—99                                   12 Claims

ABSTRACT OF THE DISCLOSURE

The invention comprises a stabilizer composition comprising boric oxide and an alkaline material preferably a carbonate selected from the group consisting of alkali metal carbonates and alkali metal bicarbonates and compositions particularly for bleaching and stain removing comprising particularly trichlorocyanuric acid, dichlorocyanuric acid and/or their alkali metal salts and isometric forms thereof, and alkali metal hydrosulfites containing the stabilizer composition.

---

This invention relates to the stabilizing of compositions containing bleaches and stabilizers for accomplishing same. More particularly, it relates to the stabilization of trichlorocyanuric acid, dichlorocyanuric acid and/or their salts and isomers, particularly alkali metal salts and alkali metal hydrosulfites and to a stabilizer system comprising boric oxide and a carbonate selected from the group consisting of alkali metal carbonates, alkali metal bicarbonates and ammonium carbonates.

Trichlorocyanuric acid, dichlorocyanuric acid, dichloroisocyanurate and their salts are excellent sources of available chlorine useful in dry bleaches, cleaning and sterilizing compositions wherein use is made of the hypochlorite chlorine which is released by these compounds upon contact with water.

However, the chlorinated cyanurates and isocyanurates are relatively unstable and are apt to produce bad odors under ordinary storage conditions of temperature, moisture and light. This tendency is increased upon mixture of other ingredients normally used in bleaching compositions and the like. To remedy the difficulty is has been suggested to add a heavy metal salt such as silver nitrate to the composition. However, these compounds are expensive and may be toxic. It has also been suggested to add complex olefins to the composition. However, these are required to be added in relatively large amounts and may produce a composition which is flammable. They, too, are expensive.

Difficulties have also been experienced with regard to the hydrosulfites which are useful as reducing agents in various stain removers such as rust removers. They too are storage sensitive under ordinary conditions and may lose their stain removing ability as well as cake or lump, frequently becoming insoluble.

Accordingly, the present invention relates to compositions which will stabilize chlorinated cyanuric acid, or the salts thereof and hydrosulfites against the deteriorating effects of storage without making the composition flammable, toxic or unduly expensive.

Broadly, the invention comprises a composition comprising boric oxide and an alkaline material, preferably an alkali carbonate, for example, sodium carbonate, sodium bicarbonate or ammonium carbonate.

More specifically, the boric oxide and alkaline material are present in a quantity sufficient to produce a pH within the range of 5–12, and, preferably, 6–8. The mole ratio of the boric oxide to carbonate, expressed as $B_2O_3/Na_2O$ is in the range of 8:1 to 0.5:1, and, preferably, 4:1 to 1:1.

In order to illustrate more clearly the manner of carrying out the present invention and the nature of the products thereof, the following examples are presented:

EXAMPLE I

| | Grams |
|---|---|
| Sodium dichloroisocyanurate | 2 |
| Boric oxide | 10.2 |
| Sodium carbonate | 7.8 |

The above ingredients in powder form were added to a laboratory powder mixer and mixed together for several minutes. The powder was then formed into tablets in a pelleting machine. The percent of available chlorine of the tablets was then determined. The tablets were stored for thirty-two days. At the end of the storage period the percent of chlorine was again determined. It was found that the tablet lost no chlorine over the thirty-two day storage period.

EXAMPLE II

| | Percent by weight |
|---|---|
| Sodium dichloroisocyanurate | 10 |
| Boric oxide | 53 |
| Sodium bicarbonate | 37 |
| | 100 |

The powdered ingredients listed above were mixed as in Example I, and formed into tablets. The tablets were then stored in heat-sealed polyethylene bags in intimate contact with sodium tetraborate pentahydrate. Chlorine loss over a thirty-two day storage period was again determined. For this formulation, only 11 percent of available chlorine was lost during the storage period.

Another formulation was prepared as in this example except that sodium tripolyphosphate, in the same quantity, was substituted for the boric oxide-sodium carbonate stabilizer. The tablets produced from this formulation were also stored with sodium tetraborate pentahydrate. Chlorine loss after a thirty-two day period was 43 percent of active chlorine. The results clearly show the need for a stabilizer in conjunction with the dichloroisocyanurate bleach.

EXAMPLE III

| | Percent by weight |
|---|---|
| Sodium hydrosulfite | 20 |
| Anhydrous citric acid | 17 |
| Boric oxide—60 mesh | 9 |
| Sodium bicarbonate | 33 |
| Ultra-Wet SK bead-dried | 21 |
| | 100 |

The above listed ingredients were mixed in a laboratory powder mixer and formed into tablets in a pelleting machine giving a tablet which is 1.75 inches in diameter, 16 mm. in thickness and containing 32 grams of material. Ultra-West SK bead surfactant was added to improve tableting. It is an alkyl aryl sulfonate detergent or surface active agent (40% active alkyl benzene sulfonate). The tablets were dissolved in water at room temperature. The time necessary to dissolve the tablets was found to be approximately five minutes. Panels uniformly stained with iron oxide (Federal Spec. P–C–450b) were used to test decolorizing efficiency. The time necessary to decolorize a stained panel was found to be approximately five minutes. The tablets were then aged for 72 hours at 50° C. After the aging period, time for dissolving was again measured. This was six minutes. Again the time necessary to decolorize a stained panel was measured. The time was still only approximately five minutes. The sodium hydrosulfite composition protected by boric oxide sodium bicarbonate composition had withstood storage without loss of quality. Even after the aging process, the tablets had not caked or become gummy with attendant lack of solubility nor had the decolorizing power been lost.

EXAMPLE IV

| | Percent by weight |
|---|---|
| Sodium hydrosulfite | 20 |
| Tartaric acid | 17 |
| Boric oxide | 9 |
| Sodium bicarbonate | 33 |
| Ultra-Wet SK bead-dried | 21 |
| | 100 |

The above listed ingredients were mixed in a laboratory powder mixer and formed into tablets as in Example III. Time required to dissolve the tablets and the time necessary to decolorize a stained panel was measured. The tablets dissolved in approximately five minutes and the panel was decolorized in four minutes. The tablets were aged for 72 hours at 50° C. The time necessary to dissolve the tablets and decolorization time was measured. The solution occurred in approximately five minutes and decolorization in approximately five minutes.

EXAMPLE V

| | Percent by weight |
|---|---|
| Sodium hydrosulfite | 24 |
| Citric acid anhydrous | 20 |
| Boric oxide—60 mesh | 10 |
| Sodium carbonate | 26 |
| Ultra-Wet SK bead-dried | 20 |
| | 100 |

The powders were mixed and formed into tablets as in Example I. Time required to dissolve the tablets was approximately ten minutes. The tablets decolorized the stained panel in five minutes. The tablets were then subjected to aging for 72 hours at 50° C. After aging, time required to dissolve the tablets was again approximately ten minutes. Time required to decolorize the panel was 5–6 minutes. The anhydrous hydrosulfite composition did not lose quality during storage.

As the above examples show, the stabilizing compositions of the present invention, comprising boric oxide and an alkali metal carbonate serve to protect bleaching agents of the oxidizing and reducing type against deterioration during storage.

Chlorocyanuric acid stabilized in accordance with the present invention, may be employed in any substantially dry composition in which a chlorocyanuric acid is otherwise suitable for use such as washing, bleaching, sterilizing and disinfecting compositions. Thus it may be used in a mixture with inert diluents including surface active agents and synthetic detergents stable in the presence of a chlorocyanuric acid. Other water soluble and insoluble organic and inorganic materials may be present including inorganic detergents; builder salts such as sodium sulfate, sodium chloride, borax, sodium silicate, alkali metal orthophosphates and polyphosphates; anti-caking agents such as bentonite, magnesium silicate, tableting ingredients, etc.

Other acidic compounds may replace the citric acid or tartaric acid used in combination with the hydrosulfite. These acids may include alkali metal acid sulfates, lactic acid, malic acid, maleic acid, alkali metal acid phosphates, alkali metal acid phthalates, paratoluene sulfonic acid, alkali metal acid citrates, glutamic acid, acetic acid, oxalic acid, gluconic acid, sulfamic acid, and phosphoric acid. Sodium metabisulfite can be included to avoid the formation of odors as the hydrosulfite formulations are dissolved.

The hydrosulfite cleaners may be in the form of a powder rather than a tablet. The powder may be used in an aerosol spray. A formulation is prepared comprising 6 grams sodium hydrosulfite, 5 grams citric acid, 2.9 grams boric oxide, 10 grams sodium bicarbonate, 6.1 grams of Ultra-Wet SK bead-dried and Micro-Cel 2.5 grams. This mix was slurried with 1.2 grams of mineral oil, 9 grams isobutane and 23 grams of Freon 12 were added as propellants. Micro-Cel is a mixture of finely divided calcium silicates. Rust decolorizing was highly effective. Zinc hydrosulfite may also be used in the bleaching composition.

The boric oxide alkali composition of this invention may be also used as stabilizers for other sensitive compounds such as peroxides, persulfates, chloromelamines, dichlorohydantoin, hydrazine, diazonium salts, nitrites, etc.

What is claimed is:
1. A bleaching and stain removing composition consisting essentially of a bleaching agent selected from the group consisting of chlorocyanuric acids, isomers thereof, salts thereof, alkali metal hydrosulfite and zinc hydrosulfite, boric oxide and an alkali material selected from the group consisting of alkali metal carbonates and ammonium carbonates.
2. The bleaching and stain removing composition of claim 1 in which said boric oxide and said alkaline material are present in amounts sufficient to produce a pH of 6 to 8 upon dissolution in water.
3. The composition of claim 1 wherein the alkali metal carbonate is selected from the group consisting of sodium carbonate and sodium bicarbonate.
4. The composition of claim 3 wherein the alkali metal carbonate is sodium bicarbonate.
5. A bleaching and stain removing composition consisting essentially of a bleaching agent selected from the group consisting of alkali metal hydrosulfite and zinc hydrosulfite, boric oxide and alkaline material selected from the group consisting of alkali metal carbonates and ammonium carbonates and a solid acid.
6. The bleaching and stain removing composition of claim 5 wherein said solid acid is selected from the group consisting of citric acid, tartaric acid, malic acid, lactic acid, alkali metal acid phosphate, alkali metal acid phthalates, paratoluene sulfonic acid, alkali metal acid citrates, maleic acid, glutamic acid, oxalic acid, gluconic acid, sulfamic acid, and sodium bisulfate.
7. The composition of claim 6 wherein said acid is tartaric acid.
8. The composition of claim 6 wherein the said acid is citric acid.
9. The method of stabilizing a compound selected from the group consisting of trichlorocyanuric acid, dichlorocyanuric acid, and salts thereof, alkali metal hydrosulfite and zinc hydrosulfite comprising mixing said compound with a stabilizing amount of boric oxide and an alkaline material selected from the group consisting of alkali metal carbonates and ammonium carbonates.
10. The method of claim 9 wherein the amount of boric oxide and said alkaline material is sufficient to produce a pH of 6 to 8 upon dissolution in water.
11. The method of claim 9 wherein said alkali metal carbonate is selected from the group consisting of sodium carbonate and sodium bicarbonate.
12. The method of claim 9 wherein said alkali metal carbonate is sodium bicarbonate.

References Cited
UNITED STATES PATENTS 3,278,443 10/1966 Bright et al. _____ 202—99
3,398,096 8/1968 Das et al. _____ 202—99

MAYER WEINBLATT, Primary Examiner

U.S. Cl. X.R.

252—397